US011876721B2

(12) United States Patent
McCreesh et al.

(10) Patent No.: US 11,876,721 B2
(45) Date of Patent: Jan. 16, 2024

(54) TIME-BASED TRAFFIC ROUTING

(71) Applicant: MICROSOFT TECHNOLOGY LICENSING, LLC, Redmond, WA (US)

(72) Inventors: Matthew John McCreesh, Seattle, WA (US); Abhishek Agarwal, Redmond, WA (US); Allen Callaway, Redmond, WA (US); Rohin Koul, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 295 days.

(21) Appl. No.: 17/227,105

(22) Filed: Apr. 9, 2021

(65) Prior Publication Data

US 2022/0329536 A1      Oct. 13, 2022

(51) Int. Cl.
*H04L 47/28*      (2022.01)
*H04L 47/11*      (2022.01)
*H04L 47/12*      (2022.01)

(52) U.S. Cl.
CPC ............. *H04L 47/28* (2013.01); *H04L 47/11* (2013.01); *H04L 47/12* (2013.01)

(58) Field of Classification Search
CPC ........... H04L 47/28; H04L 47/11; H04L 47/12
See application file for complete search history.

(56) References Cited

U.S. PATENT DOCUMENTS

| 10,791,168 | B1 * | 9/2020 | Dilley .................. H04L 67/288 |
| 11,443,251 | B2 * | 9/2022 | Fan ..................... G06Q 10/0631 |
| 2019/0097933 | A1 * | 3/2019 | Rutkowski ......... H04L 67/1021 |
| 2022/0232517 | A1 * | 7/2022 | Liu .................... H04W 74/0808 |

FOREIGN PATENT DOCUMENTS

CN          104581779 A  *  4/2015    ............ H04W 24/02

OTHER PUBLICATIONS

English Translation for CN_104581779_A_I Tan (Year: 2015).*

(Continued)

*Primary Examiner* — Mohammad S Adhami
*Assistant Examiner* — Weibin Huang
(74) *Attorney, Agent, or Firm* — Newport IP, LLC; Jacob P. Rohwer (57) ABSTRACT

The techniques described herein enable the use of a time factor for traffic management and routing. A system is configured to analyze traffic for a service over a period of time and identify (e.g., learn) traffic patterns that reflect a substantial effect on traffic during a particular real-world event. Using the traffic patterns identified via the analysis, the system can provide valuable time-based traffic information to service providers. A service provider can then create a predefined time-based profile that is used by a traffic manager to switch from a current traffic routing configuration to a different traffic routing configuration that better accommodates an expected traffic load for various endpoints. The predefined time-based profile specifies a scheduled time at which the switch is to occur, and this scheduled time can correspond to a start time for a real-world event that is known to cause an increase or decrease in traffic.

13 Claims, 7 Drawing Sheets

(56) References Cited

OTHER PUBLICATIONS

"Traffic Manager Documentation", Retrieved from: https://web.archive.org/web/20210410144243/https://docs.microsoft.com/en-us/azure/traffic-manager/, Apr. 10, 2021, 2 Pages.

Au, et al., "Nested Traffic Manager Profiles", Retrieved From: https://web.archive.org/web/20210119155409/https://docs.microsoft.com/en-us/azure/traffic-manager/traffic-manager-nested-profiles, Oct. 22, 2018, 9 Pages.

Au, et al., "Traffic Manager Routing Methods", Retrieved From: https://web.archive.org/web/20201111230845/https://docs.microsoft.com/en-us/azure/traffic-manager/traffic-manager-routing-methods, Sep. 17, 2018, 11 Pages.

Gilad, et al., "CDN-on-Demand: An Affordable DDoS Defense via Untrusted Clouds", In Proceedings of 23rd Annual Network and Distributed System Security Symposium, Feb. 21, 2016, 15 Pages.

"International Search Report and Written Opinion Issued in PCT Application No. PCT/US22/021067", dated Jun. 29, 2022, 16 Pages.

Russinovich, Mark, "Azure Responds to COVID-19", Retrieved From: https://azure.microsoft.com/en-us/blog/azure-responds-to-covid19/, Jun. 16, 2020, 1 Page.

* cited by examiner

TIME-BASED TRAFFIC ROUTING

BACKGROUND

A datacenter may house computer systems and various networking, storage, and other related components. Datacenters are often used by service providers to provide computing services to businesses and/or individuals over a network connection. In one example, datacenters can operate cloud-based platforms (e.g., AMAZON WEB SERVICES, MICROSOFT AZURE, etc.) that host various services thereby enabling end-users and/or end-user devices to access the services. In this example, the services may be offered by an entity operating a cloud-based platform, or by "customers" or "tenants" of the cloud-based platform. Accordingly, a service provider, as used herein, may be the entity operating a cloud-based platform or an entity that is a customer or a tenant of the cloud-based platform.

In many situations, a service provider may strategically offer a service utilizing different geographically dispersed datacenters and/or other resources. These geographically dispersed datacenters may be referred to as "endpoints". Accordingly, an endpoint includes a group of servers and/or other devices (e.g., networking equipment) that work together in order to efficiently provide the service to end-users. In one example, the efficient provision of the service is a result of improved performance due to the geographical proximity between an end-user device that requests content from the service and an endpoint that responds to the request and provides the content to the end-user device.

When multiple endpoints are utilized to offer a service, traffic routing techniques are used to route a request to one of the multiple endpoints. As referenced above, one traffic routing technique that is can be used is routing a request based on performance. That is, the request is routed to an endpoint that provides the lowest latency, which is often the geographically closest endpoint. This traffic routing technique often improves the user experience because it allows for the fastest response time from servers at an endpoint due to the reduced latencies.

However, servers at a particular endpoint can become overloaded with requests using the performance-based routing technique, as well as other routing techniques. An overload can greatly diminish the performance of the servers that compose the particular endpoint and/or can even cause the servers to fail. To control the load on individual endpoints, service providers typically implement a load aware approach. Using the aforementioned example of the performance-based routing technique in an overload scenario, the conventional load aware approach would redirect traffic (e.g., end-user requests) from a performance-based endpoint (e.g., the geographically closest endpoint) to an alternative endpoint (e.g., one that is geographically further away from the end-user device but that has capacity to handle additional traffic).

One of the problems with this load aware approach is that the service provider must expend resources, at a great cost, to monitor the health of the endpoints and identify overload situations. For instance, the service provider must continuously collect a large amount of data (e.g., CPU utilization at each endpoint, network bandwidth of each endpoint, etc.), analyze the data to generate signals, and/or calibrate the signals to identify overload situations. Furthermore, this load aware traffic management approach is reactive and relies upon moving traffic from one endpoint to another endpoint after the load on the first endpoint becomes high and is likely to cause some problems. Stated alternatively, in many situations, the load aware traffic management approach is unable to effectively remove traffic from an impacted endpoint before the performance of the impacted endpoint is negatively affected and/or servers of the impacted endpoint begin to fail.

It is with respect to these and other considerations the disclosure made herein is presented.

SUMMARY

The techniques disclosed herein enable the use of a time factor for traffic management and routing. The time factor can correspond to a scheduled real-world event that is known to have an effect on traffic routing and/or the load on different endpoints. That is, the scheduled real-world event is known to increase or decrease the amount of a traffic for a service at a scheduled time and/or for a known duration. By offering time as a factor for traffic management and routing, a service provider can configure improved load balancing strategies compared to the load aware traffic routing approach that is often used. More specifically, using the techniques described herein, no health monitoring is needed thereby saving time and computing resources.

Conventional traffic routing solutions fail to take into account a time (e.g., time of the day, time of the week, time of the month, and/or time of the year, etc.) when making traffic routing decisions. However, a scheduled time for a real-world event can be a strong indicator of load in situations where traffic patterns associated with the real-world event are predictable. As used herein, "traffic" can include requests for services (e.g., content) coming in from end-user devices based on input from end-users. These requests are received by a traffic manager or load balancer, for example, and routed to various endpoints. The "load" on a particular endpoint is based on a number of such requests that are routed to the particular endpoint by the traffic manager or the load balancer.

There are a number of real-world events that occur where traffic patterns are predictable for a particular service. The real-world events may be associated with, or unique to, a geographic region (e.g., a state, a province, a country, a continent, etc.) and/or a time zone (e.g., a Coordinated Universal Time—UTC). A real-world event can be a planned public or social occasion that has a significant effect on an amount of traffic received for a particular service. For instance, the real-world event may cause a dramatic increase (e.g., a spike) in traffic. Alternatively, the real-world event may cause a dramatic decrease (e.g., a dip) in traffic.

In one example, a real-world event can reflect a series of video conference meetings implemented across institutions (e.g., businesses, schools, households, etc.). History shows that traffic spikes for video conferencing services at 9:00 AM in any given time zone because this scheduled time is the typical start of a workday for many employers, and thus, teams of employees often meet and collaborate at 9:00 AM to touch base and discuss the projects being worked on. In another example, a real-world event can correspond to stock exchange openings and/or closings where service providers see an increased demand for stock trading services. In yet another example, a real-world event can correspond to payroll processing times (e.g., a monthly or a bi-monthly schedule) where corporate payroll service providers typically see an increased amount of traffic. Further, a real-world event can correspond to certain Holidays (e.g., Black Friday, the week before Christmas, etc.) where e-commerce sites typically see an increased amount of traffic. These are just a few of many examples of different types of real-world events that can cause a predictable traffic pattern that reflects an increased amount of traffic that can overload a particular endpoint at a scheduled or known time (e.g., time of the day, time of the week, time of the month, and/or time of the year, etc.).

Accordingly, a real-world event is associated with predefined times such as a start time and/or an end time. The scheduling nature of a real-world event may be periodic such that it occurs daily (e.g., every workday from 9:00 AM to 9:30 AM), weekly (e.g., every Tuesday from 4:00 PM to 5:00 PM), monthly (e.g., the second Tuesday of every month from 9:00 AM to 5:00 PM), yearly (e.g., Black Friday—the day after Thanksgiving in the United States each year), etc. Alternatively, a real-world event may be a stand-alone event for which the scheduled time is announced in advance of the real-world event. That is, the scheduling of the real-world event may not be periodic with respect to time, but an announcement or publication of the real-world event defines a start time and/or an end time when traffic for a particular service spikes or dips. In a specific example, a promoter may announce a time when tickets can be bought for a boxing match between the two top-ranked boxers, and thus, traffic for ticket sales may spike.

The system described herein is configured to analyze traffic for a service over a period of time and identify (e.g., learn) traffic patterns that reflect a substantial effect on traffic during a particular real-world event. In one example, the effect on traffic is substantial if it causes load concerns for an individual endpoint, such that performance of the individual endpoint may be negatively affected. That is, as part of the analysis, the system described herein can be configured to learn and use load thresholds for a particular service and/or endpoint. When these load thresholds are exceeded, performance of the particular service and/or endpoint is likely to be negatively affected.

Using the traffic patterns identified via the analysis, the system can provide valuable time-based traffic information to service providers. This information can include the service affected by the spike or dip in traffic, the geographic location (e.g., time zone, country, etc.) in which the spike or dip in traffic occurs, the times at which the spike or dip in traffic starts and/or ends, and/or an amount of load on endpoint(s) that results from the spike or dip in traffic. Consequently, the times for a given real-world event can be deduced from traffic patterns.

Using this time-based traffic information, a service provider can create a predefined time-based profile that allows for a current traffic routing configuration for a service to be switched to a different traffic routing configuration that better accommodates an expected increase or decrease in traffic for a particular endpoint. The predefined time-based profile specifies a scheduled time at which the switch is to occur, and this scheduled time can correspond to a start time for a real-world event that is known to cause the increase or decrease in traffic. Accordingly, the service provider can proactively and effectively manage the load on endpoints for real-world events without needing to collect and analyze health data and then react to a situation that overloads a particular endpoint. While the example traffic patterns described herein reflect predictable spikes and/or dips in traffic, other types of predictable traffic patterns can also be used by a service provider to proactively and effectively manage the load on different endpoints that offer a service.

The operations disclosed herein can be implemented by a traffic management and/or load balancing system. For instance, the predefined time-based profile can be maintained and used by the traffic management system and/or load balancing to implement the switch between traffic routing configurations. Consequently, the techniques described herein can enable service providers to configure policies that accurately meet load balancing and traffic management needs at a scheduled time and/or for a scheduled duration. As described above, the scheduled time and the scheduled duration often correspond to a real-world event. In various examples, the traffic management and/or load balancing system can comprise a Domain Name System (DNS) global server load balancing system that provides an Internet Protocol (IP) address for an endpoint in response to a received request for a service. In various examples, the provision of the IP address is based on a current traffic routing configuration set up by a service provider. Alternatively, the traffic management and/or load balancing techniques described herein can be implemented via other traffic management and/or load balancing systems such as a Transmission Control Protocol and the Internet Protocol (TCP/IP) router (e.g., layer 4), a User Datagram Protocol (UDP) based load balancer, or a Hypertext Transfer Protocol (HTTP) load balancer (e.g., layer 7).

In a more specific example, a service provider can use a predefined time-based profile to switch, at a particular start time for a real-world event, from a performance routing configuration to a weighted routing configuration. The performance routing configuration allows for a service provider to direct requests (e.g., DNS queries) to the endpoints with the lowest latencies (e.g., the geographically closest endpoints) based on a location at which the requests originate, thereby improving performance. The weighted routing configuration allows for a service provider to distribute traffic across a set of endpoints based on preestablished weights or prefixed percentages. The weights can be set to distribute the traffic evenly across all endpoints (e.g., in a round robin fashion), or the weights can be set to distribute traffic in an uneven manner (e.g., 80% of requests are routed to one endpoint while 20% of the requests are routed to another endpoint).

In this more specific example, the performance routing configuration has the potential to cause all the traffic in a particular geographic location (e.g., a particular time zone) to be routed to the same endpoint (e.g., the geographically closest endpoint). Provided a scenario in which a real-world event that causes an amount of traffic to spike, this endpoint may be overloaded causing performance issues. By switching the performance routing configuration to the weighted routing configuration at a time, or just prior to, when the real-world event is scheduled to begin, a service provider can proactively allocate overflow traffic (e.g., 10%, 20%, 30%, etc.) from the endpoint with the lowest latency to an alternative endpoint with a higher latency (e.g., an endpoint that is geographically further away) but that can handle the traffic. In this way, the user experience is not negatively affected due to an overloaded endpoint.

In other examples, a service provider can establish a predefined time-based profile to switch between other traffic routing configurations to meet demand for a service in the best way possible. Other traffic routing configurations can include a priority routing configuration that routes traffic to a designated primary endpoint, regardless of location. If the primary endpoint fails or is unavailable, then the priority routing configuration routes the traffic to designated backup endpoint(s). Other traffic routing configurations can also include a geographic routing configuration that routes traffic to a designated endpoint (e.g., may not be the geographically closes endpoint) based on a location at which requests originate. The geographic routing configuration is used to improve performance but also enables a service provider to be in compliance with scenarios such as data sovereignty mandates for different jurisdictions and/or the localization of content and user experience. Other traffic routing configurations can further include a multi-value traffic routing configuration that returns all healthy endpoints with IPv4/IPv6 addresses in response to a request. Other traffic routing configurations can include a subnet traffic routing configuration that maps sets of end-user IP address ranges to a specific endpoint. That is, when a request is received, the endpoint returned is the one that is mapped for that request's source IP address. These example traffic routing configurations are not exhaustive, and it is contemplated that other traffic routing configurations can be used in association with the techniques described herein.

In contrast to the reactive nature of load aware traffic management approaches, with time-based traffic routing, data can be used to create static configurations that behave in more predictable ways. The advantages of using the time-based traffic routing techniques described herein instead of load aware traffic routing include a higher level of determinism and/or the ability to analyze time series data to implement optimal load balancing strategies, for geographic locations, in a proactive manner for specific times of day, times of the week, times of the month, and/or times of the year.

The techniques disclosed herein provide a number of features that improve existing computing devices. For instance, computing resources such as processor cycles, memory, network bandwidth, and power, do not have to be used to monitor traffic load on endpoints. Moreover, the chance that an overloaded endpoint leads to server failures and/or performance issues is greatly reduced. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Described herein is a system that enables the use of a time factor for traffic management and routing. The time factor can correspond to a scheduled real-world event that is known to have an effect on traffic routing and/or the load on different endpoints. That is, the scheduled real-world event is known to increase or decrease the amount of a traffic for a service at a scheduled time and/or for a known duration. By offering time as a factor for traffic management and routing, a service provider can configure improved load balancing strategies compared to the load aware traffic routing approach that is often used. More specifically, using the techniques described herein, no health monitoring is needed thereby saving time and computing resources.

The system is configured to analyze traffic for a service over a period of time and identify (e.g., learn) traffic patterns that reflect a substantial effect on traffic during a particular real-world event. Using the traffic patterns identified via the analysis, the system can provide valuable time-based traffic information to service providers. A service provider can then create a predefined time-based profile that is used by a traffic manager to switch from a current traffic routing configuration to a different traffic routing configuration that better accommodates an expected traffic load for various endpoints. The predefined time-based profile specifies a scheduled time at which the switch is to occur, and this scheduled time can correspond to a start time for a real-world event that is known to cause an increase or decrease in traffic. Accordingly, the service provider can proactively and effectively manage the load on endpoints for real-world events without needing to collect and analyze health data.

Figure 1:
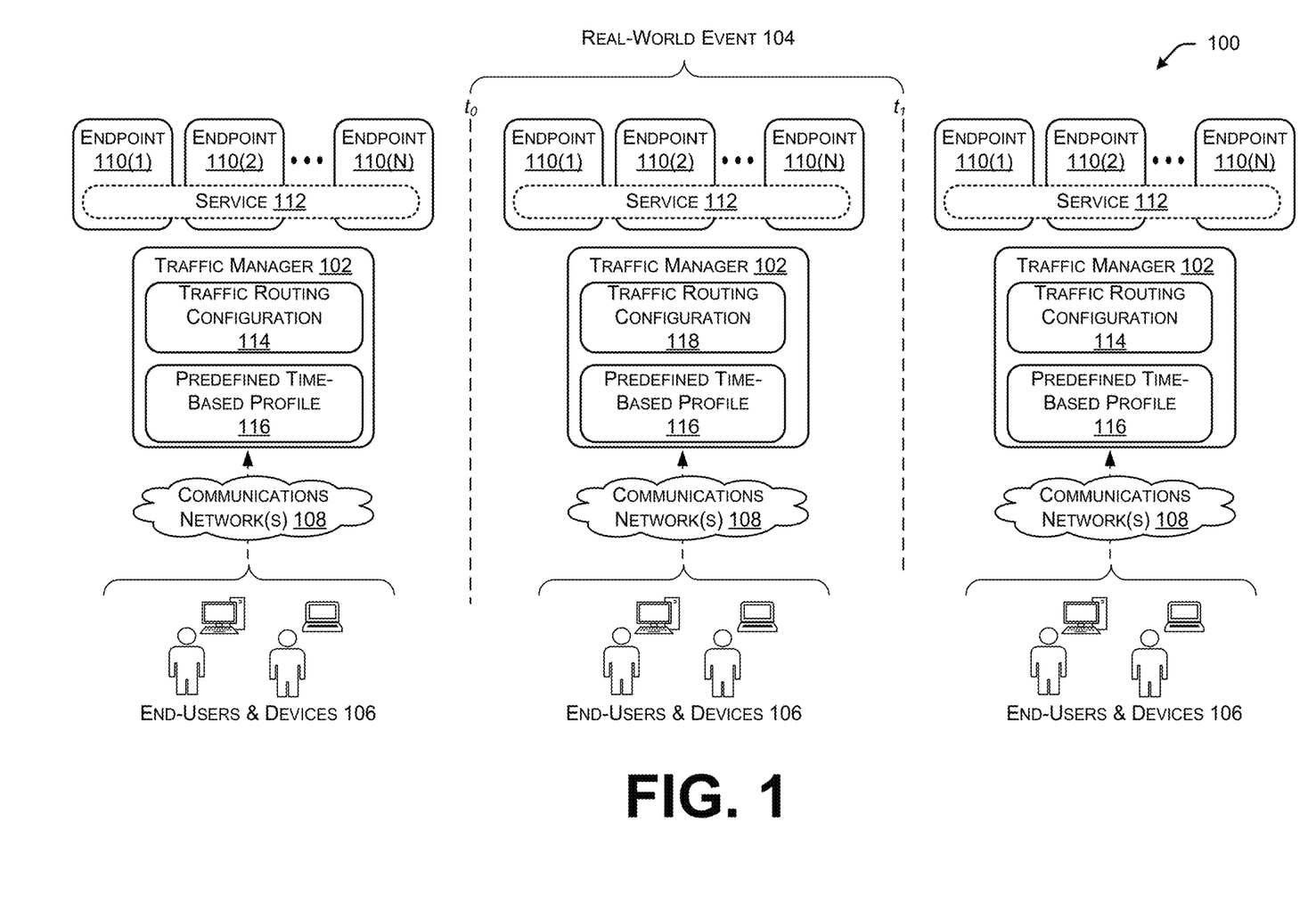
FIG. 1 illustrates an example scenario in which a service provider can create a predefined time-based profile that allows for a traffic manager to switch between traffic routing configurations in order to best accommodate expected load for a time period associated with a real-world event.

FIG. 1 illustrates an example scenario 100 in which a service provider can create a predefined time-based profile that allows for a traffic manager 102 to switch between traffic routing configurations in order to best accommodate expected load for a time period associated with a real-world event 104. While the figures refer to a traffic manager 102, the techniques described herein may also be implemented via a load balancer.

As described above, the traffic manager 102 comprises a system that is tasked with routing traffic, or individual requests, received from end-users and end-user devices 106 over communication network(s) 108, to one of the endpoints 110(1-N) configured to offer a requested service 112 on behalf of the service provider. Here, N is a positive integer number such as two, three, four, five, ten, twenty, fifty, etc. Accordingly, in various examples, the traffic manager 102 can comprise a Domain Name System (DNS) global server load balancing system that provides an Internet Protocol (IP) address for an endpoint 110 in response to a request for the service 112. Alternatively, the traffic manager 102 can be implemented via other routing systems such as a Transmission Control Protocol and the Internet Protocol (TCP/IP)

router (e.g., layer 4), a User Datagram Protocol (UDP) based load balancer, or a Hypertext Transfer Protocol (HTTP) load balancer.

On the left side of FIG. 1, the traffic manager 102 is configured to route the requests in accordance with a first, or current, traffic routing configuration 114. The traffic manager 102 is also configured to store a predefined time-based profile 116. The predefined time-based profile 116 is created by, and received from, the service provider. The predefined time-based profile 116 indicates a start time, to, and/or an end time, $t_1$, for the real-world event 104. The traffic manager 102 is configured to determine when a current real-world time corresponds to the start time, to, for the real-world event. Based on this determination, the traffic manager 102 switches from using the first traffic routing configuration 114 to using a second traffic routing configuration 118 that is different than the first routing configuration 114, as shown in the middle section of FIG. 1.

During a time period between the start time, to, and the end time, $t_1$, the traffic manager 102 routes the requests from end-users and end-user devices 106 using the second traffic routing configuration 118. The traffic manager 102 is further configured to determine when the current real-world time corresponds to the end time, $t_1$, for the real-world event 104. Based on this determination, the traffic manager 102 switches from using the second traffic routing configuration 118 back to using the first traffic routing configuration 114.

In one example, a traffic routing configuration includes a performance routing configuration that directs requests (e.g., DNS queries) to endpoints that provide the best performance, or the lowest latencies, based on a location at which the requests originate. In many cases but not all, such endpoints are the geographically closest endpoints. In another example, a traffic routing configuration includes a weighted routing configuration that distributes traffic across a set of endpoints based on preestablished weights or prefixed percentages. The weights can be set to distribute the traffic evenly across all endpoints (e.g., in a round robin fashion), or the weights can be set to distribute traffic in an uneven manner (e.g., 80% of requests are routed to one endpoint while 20% of the requests are routed to another endpoint).

Other traffic routing configurations can include a priority routing configuration that routes traffic to a designated primary endpoint, regardless of location. If the primary endpoint fails or is unavailable, then the priority routing configuration routes the traffic to designated backup endpoint(s). Further, a geographic routing configuration routes traffic to a designated endpoint (e.g., may not be the geographically closes endpoint) based on a location at which requests originate. The geographic routing configuration is used to improve performance but also enables a service provider to be in compliance with scenarios such as data sovereignty mandates for different jurisdictions and/or the localization of content and user experience. A multi-value traffic routing configuration returns all the healthy endpoints with IPv4/IPv6 addresses in response to a request. A subnet traffic routing configuration maps sets of end-user IP address ranges to a specific endpoint. That is, when a request is received, the endpoint returned is the one that is mapped for that request's source IP address. These example traffic routing configurations are not exhaustive, and it is contemplated that other traffic routing configurations can be used in association with the techniques described herein.

In an additional example, a service provider can implement nested traffic routing configurations that allow for hierarchical routing configurations. For instance, requests can initially be routed to a location based on a first routing configuration, and from there, can be routed to an endpoint based on a second routing configuration.

As mentioned above, the predefined time-based profile 116 can be created by a service provider to proactively use time as a factor when making routing decisions. For example, if at 9:00 AM UTC every weekday (e.g., workdays—Monday through Friday) traffic peaks in one geographic location (e.g., Western Europe) and an endpoint is overloaded due to a current traffic routing configuration (e.g., performance routing configuration), a time-based routing approach can be used to change how the user requests are routed to accommodate the traffic peak at this given time. Thus, during this peak load time for a particular service, the predefined time-based profile 116 can be used to proactively switch to a more suitable traffic routing configuration.

Note that while examples described herein are mostly associated with a time period where there is an increase in load, the techniques described herein can alternatively be used to switch traffic routing configurations to accommodate a decrease in load. Moreover, time-based routing can also support several other use cases, such as the seamless handling of planned maintenance on specific endpoints. In such a scenario, a service provider knows a particular endpoint will be unavailable or have limited capacity at a specific time, and thus, the service provider can create a predefined time-based profile 116 to proactively route traffic to other endpoints before the maintenance starts at the specific time.

Figure 2:
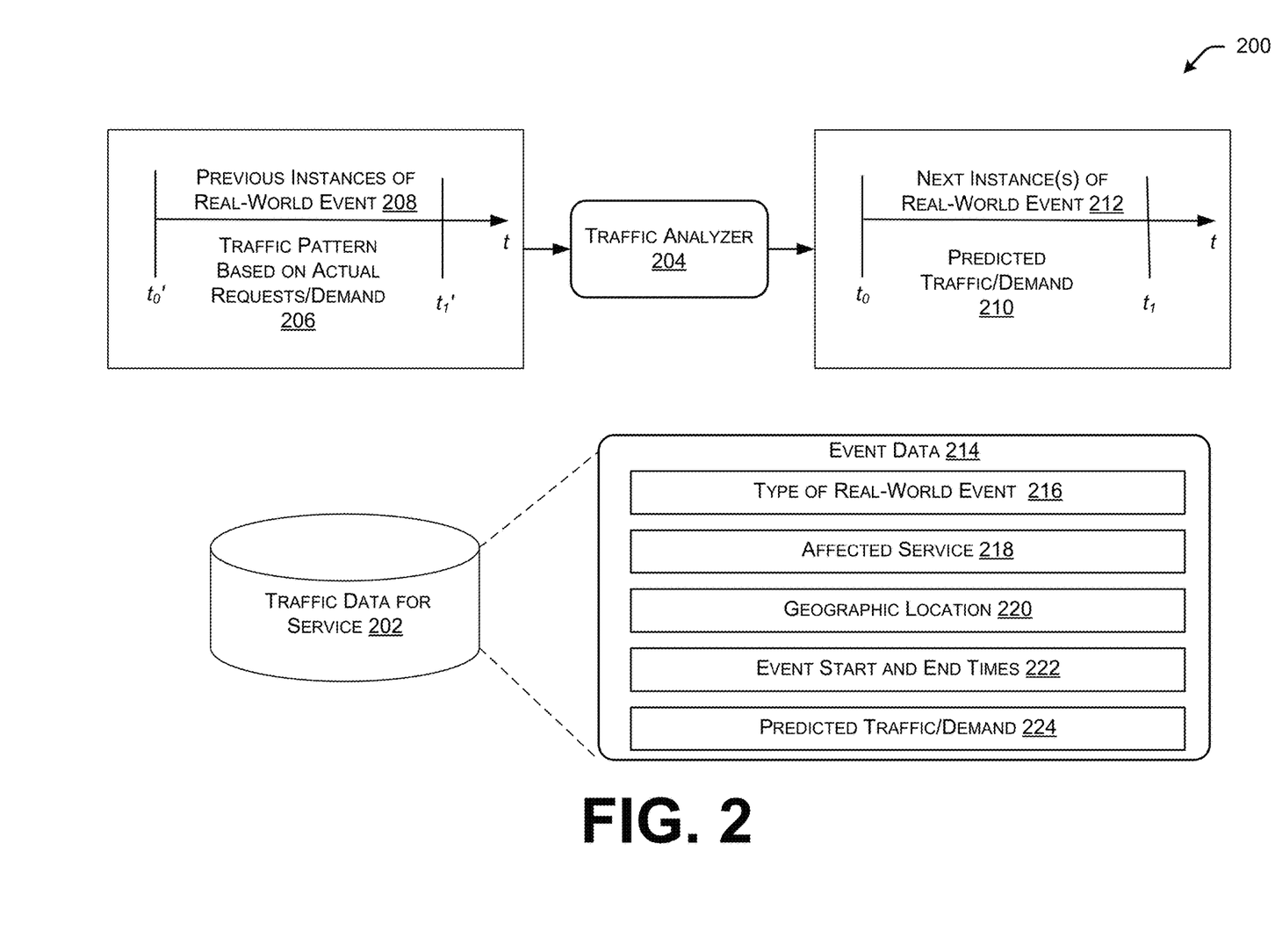
FIG. 2 illustrates an example scenario in which traffic for a particular service can be analyzed to identify a time period, associated with a real-world event, during which traffic is predictable.

FIG. 2 illustrates an example scenario 200 in which traffic for a particular service can be analyzed to identify a time period during which traffic is predictable. In many cases, the time period is associated with a real-world event. That is, there are a number of real-world events that occur where traffic patterns are predictable for a particular service. The real-world events may be associated with, or unique to, a geographic region (e.g., a state, a province, a country, a continent, etc.) and/or a time zone (e.g., a Coordinated Universal Time—UTC). A real-world event can be a planned public or social occasion that has a significant effect on an amount of traffic received for a particular service. For instance, the real-world event may cause a dramatic increase (e.g., a spike) in traffic. Alternatively, the real-world event may cause a dramatic decrease (e.g., a dip) in traffic. However, the techniques described herein can also be implemented without linking a traffic pattern to a known real-world event, as long as the traffic pattern is predictable (e.g., periodic) and has a known start time and/or end time.

FIG. 2 further illustrates a database 202 that stores traffic data for a service, collected and stored over a long period of time. A traffic analyzer 204 is configured to analyze the traffic data for the service and identify (e.g., learn) a traffic pattern 206. More specifically, the traffic analyzer 204 can identify previous time periods ($t_0'$ to $t_1'$) where the traffic behaves similarly with regard to a set of endpoints or with regard to an individual endpoint. In one example, a traffic pattern reflects that an amount of traffic increase is substantial such that it causes load concerns for a particular endpoint and/or a particular geographic location. As part of the analysis, the traffic analyzer 204 can be configured to learn and use load thresholds for a particular service and/or a particular endpoint. When these load thresholds are exceeded, performance of the particular service and/or the particular endpoint is likely to be negatively affected.

In various examples, the traffic analyzer 204 can associate the traffic pattern 206 with previous instances of a real-world event 208. For instance, the traffic analyzer 204 can deduce a real-world event from the analyzed traffic data (e.g., a large number of videoconference meeting occur at 9:00 AM UTC, a large group of people in the United States shop online on Black Friday, etc.). Alternatively, the traffic analyzer 204 may be made aware of a real-world event that caused the traffic pattern via a publication and/or an announcement. Accordingly, the traffic analyzer 204 can predict traffic 210, for a service and/or an endpoint, that begins at a first time, $t_0$, and/or that ends at a second time, $t_1$. The traffic 210 is predicted for next instances of the real-world event 212.

The traffic analyzer 204 is configured to store, in the database 202, event data 214 associated with a real-world event. For example, the event data 214 can include a type of real-world event 216 (e.g., a name and/or a description), the service affected by the traffic pattern 218 (e.g., the spike or the dip in traffic), the geographic location (e.g., time zone, country, etc.) in which the traffic pattern occurs 220, the times at which the traffic pattern starts and/or ends 222, and/or an amount of predicted traffic 224 (e.g., demand, load) on endpoint(s) as determined via the identified traffic pattern.

The traffic analyzer 204 may be part of the traffic management and/or load balancing system, and thus, can provide the event data 214 to a service provider. Using this event data 214, the service provider can create the predefined time-based profile 116 that allows for a current traffic routing configuration for a service to be switched to a different traffic routing configuration that better accommodates an expected increase or decrease in traffic for a particular endpoint. This switch may be a temporary switch to accommodate, for example, a peak load caused by a real-world event. Accordingly, the service provider can proactively and effectively manage the load on endpoints for real-world events without needing to collect and analyze health data and then react to a situation that overloads a particular endpoint.

Figure 3:
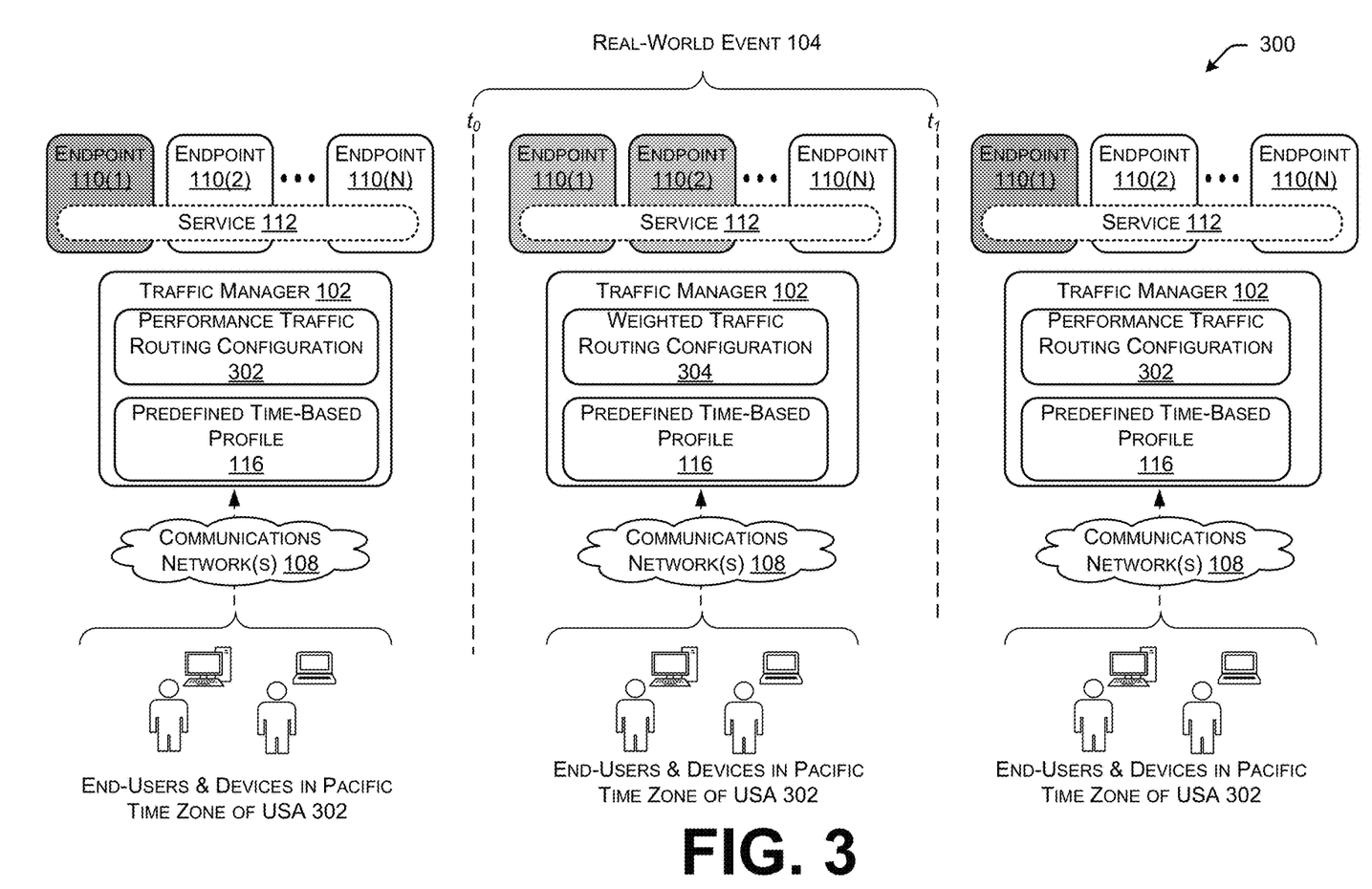
FIG. 3 illustrates an example scenario in which a service provider can create a predefined time-based profile that allows for a traffic manager to switch between traffic routing configurations in order to accommodate an expected increase in traffic for a particular endpoint.

FIG. 3 illustrates an example scenario 300 in which a service provider can create a predefined time-based profile 116 that allows for a traffic manager 102 to switch between traffic routing configurations in order to accommodate an expected increase in traffic for a particular endpoint. Similar to the discussion of FIG. 1, the traffic manager 102 receives requests for the service 112 from end-users and end-user devices over communications network(s) 108. However, in this scenario 300, the end-users and end-user devices are located in a particular geographic location 302 (e.g., United States—Pacific Time Zone). Further, in this scenario 300, the current traffic routing configuration being used by the traffic manager 102 is a performance traffic routing configuration 302.

As described above, the performance traffic routing configuration 302 directs the received requests to endpoints that can provide the lowest latencies based on a location at which the requests originate, thereby improving performance. Since, in this scenario 300, all the end-users and end-user devices are located in the same geographic location 302, then all the requests are likely to be routed to the same endpoint 110(1)—shown via the shading of endpoint 110(1). The endpoint 110(1) may be located in the western part of the United States, while the other endpoints 110(2-N) may be located further away (e.g., eastern part of the United States, Europe, Asia, South America, Africa, etc.).

As discussed above with respect to FIG. 2, the traffic analyzer 204 may have previously identified a traffic pattern, such as a spike in traffic, for the service 112 during a real-world event 104 that occurs in the geographic location—the Pacific Time Zone of the United States. This traffic pattern may have been determined as a likely source of performance issues for the endpoint 110(1).

Consequently, in this scenario 300, the predefined time-based profile 116 specifies a time, $t_0$, when the real-world event 104 starts in the geographic location, as well as a time, $t_1$, when the real-world event 104 ends in the geographic location. At the start time, the predefined time-based profile 116 instructs that traffic manager 102 to switch to using the weighted traffic routing configuration 304. As described above, the weighted traffic routing configuration 304 distributes traffic across endpoints based on preestablished weights or prefixed percentages. Accordingly, in this scenario 300, the service provider can use the predefined time-based profile 116 to reduce the load on endpoint 110(1), that would have occurred during the real-world event 104 had the performance traffic routing configuration 302 continued to be used. This is done by switching the routing technique to the weighted traffic routing configuration 304, where a fixed percentage of the traffic (e.g., 20%, 30%, etc.) can be redirected to another endpoint 110(2) (as shown via the shading).

Similarly, at the end time for the real-world event 104, the predefined time-based profile 116 can instruct that traffic manager 102 to switch back to using the performance traffic routing configuration 302. After the real-world event 104 has ended, the endpoint 110(1) is able to handle all the traffic again.

In various examples, the traffic manager 102 may receive an announcement of a new instance of a real-world event and use the announcement to update the predefined time-based profile 116 to reflect an announced start time and an announced end time of the new instance of the real-world event.

This scenario 300 reflects an example situation where a web application is deployed to endpoints in the Unites States and Europe, for example. Most of the time, the owner of the web application wants to direct requests for the web application to the endpoint closest to where the requests originate to improve the user experience. But, if the traffic analyzer 204 find that at 9:00 AM UTC the number of requests regularly puts the endpoint in Europe near or beyond a defined capacity, while the endpoint in the United States is running well below a defined capacity, then the time-based routing techniques described herein can allow the traffic routing configuration to change at 9:00 AM UTC to send a prefixed percentage of traffic to the endpoint in the United States, to prevent an overload on the endpoint in Europe.

Figure 4:
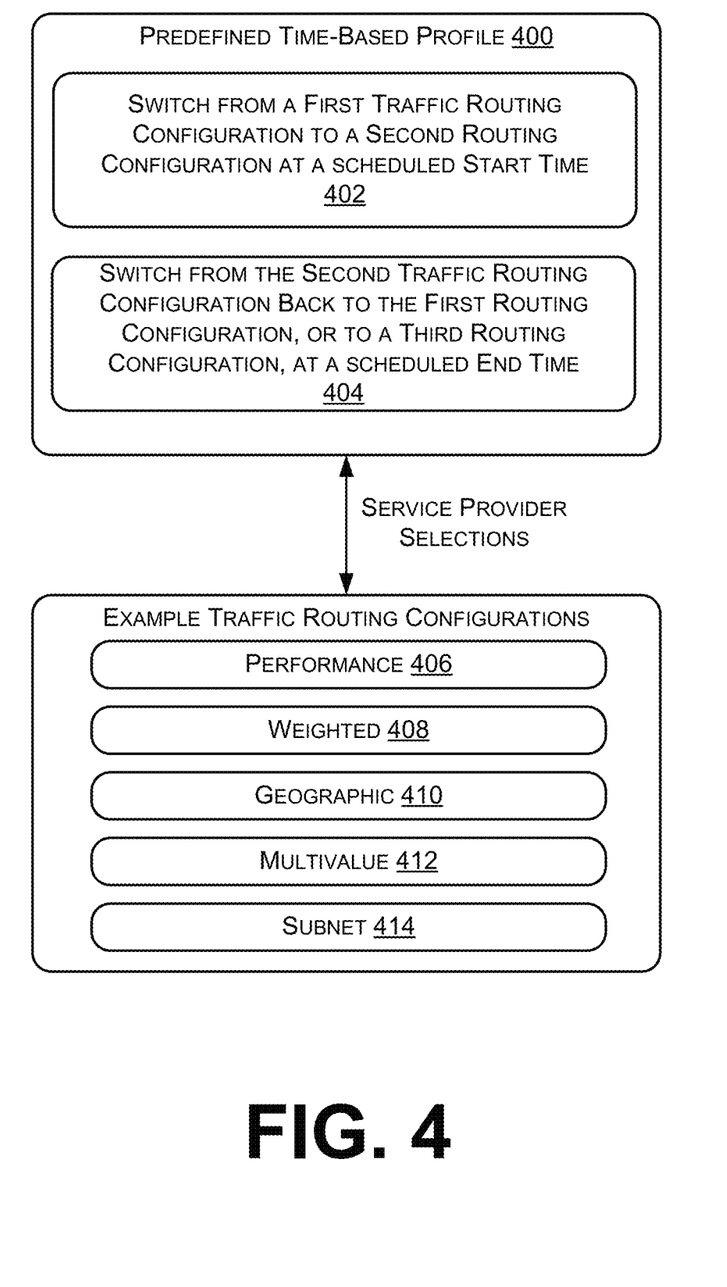
FIG. 4 illustrates an example predefined time-based profile usable to switch traffic routing configurations.

FIG. 4 illustrates an example predefined time-based profile 400 usable to switch traffic routing configurations. As described above, the predefined time-based profile 400 can be created by a service provider, or owner of a service, based on information produced via an analysis of traffic and identified traffic patterns associated with real-world events. The predefined time-based profile 400 includes a first instruction 402, for a traffic manager, to switch from a first traffic routing configuration to a second routing configuration at a scheduled start time. The predefined time-based profile 400 may also include a second instruction 404 to switch from the second traffic routing configuration back to the first routing configuration, or to a third traffic routing configuration, at a scheduled end time.

As shown in FIG. 4, the traffic routing configurations can be selected by the service provider from a group comprising: a performance traffic routing configuration 406, a weighted traffic routing configuration 408, a geographic traffic routing configuration 410, a multivalue traffic routing configuration 412, and/or a subnet traffic routing configuration 414.

Figure 5:
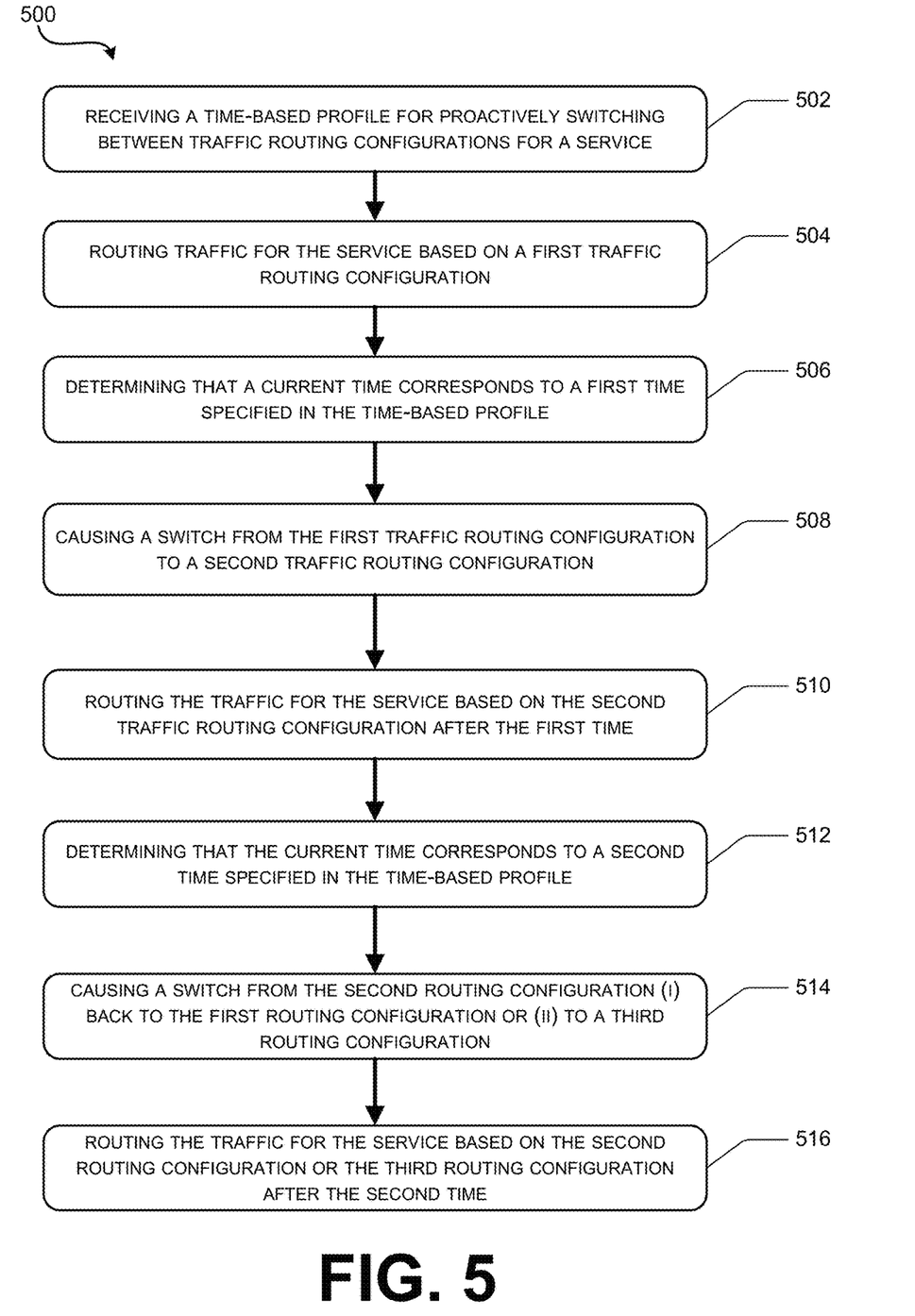
FIG. 5 is a flow diagram illustrating aspects of a sample routine that allows for a traffic manager to switch between traffic routing configurations in order to best accommodate expected load for a time period.
Figure 6:
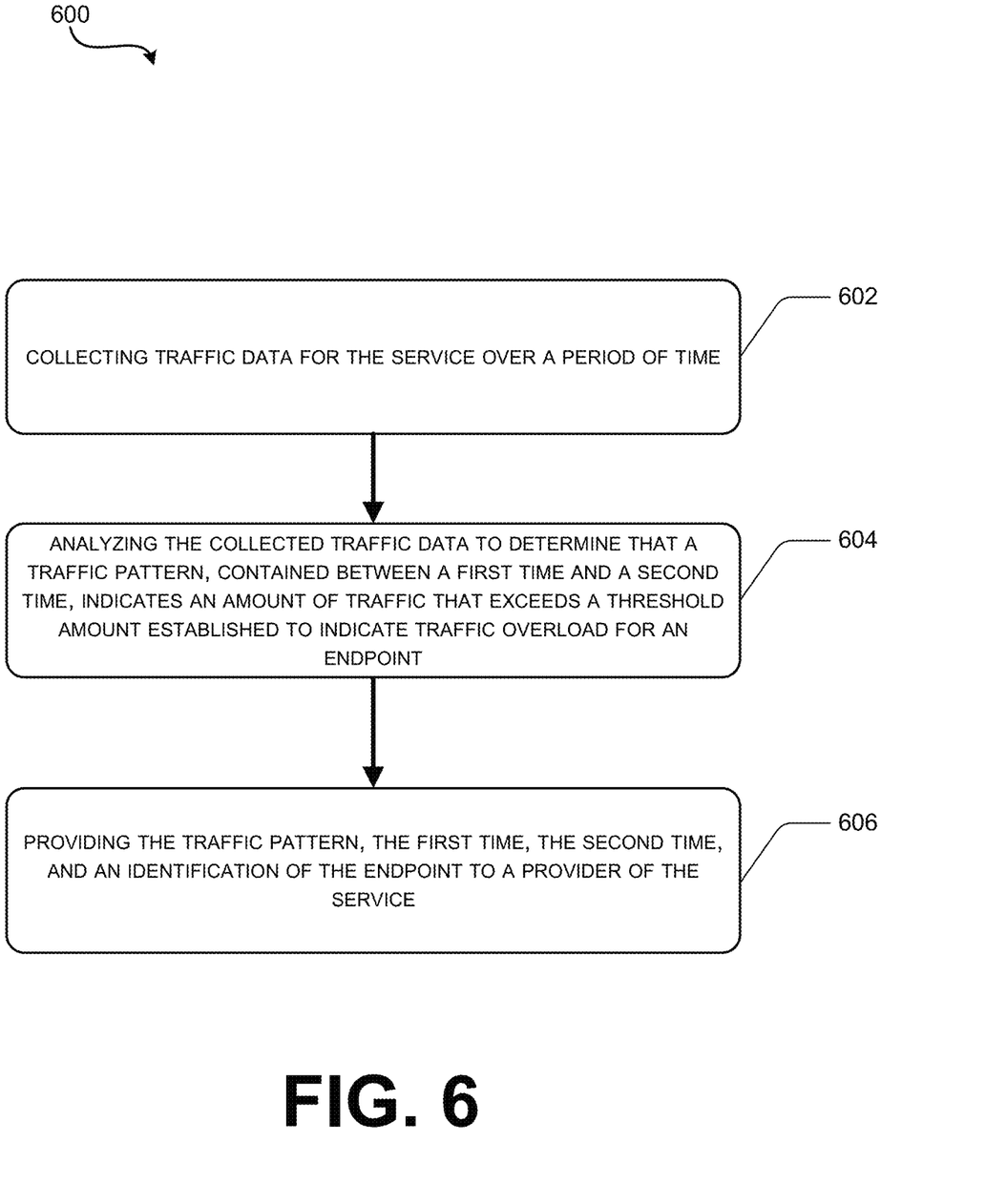
FIG. 6 is a flow diagram illustrating aspects of a sample routine that allows for the collection and analysis of traffic data to identify traffic patterns that can best be accommodated by switching between traffic routing configurations.

FIGS. 5 and 6 are flow diagrams illustrating routines describing aspects of the present disclosure. In various examples, operations of the routines can be performed by a traffic management system. The logical operations described herein with regards to FIG. 5 or 6 can be implemented (1) as a sequence of computer implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations of the routines can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustrations may refer to components of the figures, it can be appreciated that the operations of the routines may be also implemented in many other ways. For example, the routines may be implemented, at least in part, by another remote computer, processor, or circuit. In the examples described herein, one or more modules of a computing system can receive and/or process the data. Any service, circuit, or application suitable for providing the techniques disclosed herein can be used in the operations described.

With reference to FIG. 5, the routine 500 begins at operation 502 where a time-based profile is received from a service provider. As described above, the time-based profile is configured to proactively switch between traffic routing configurations for a service offered by the service provider. At operation 504, a traffic manager is configured to route traffic for a service based on a first traffic routing configuration. At operation 506, the traffic manager determines that a current time corresponds to a first time specified in a time-based profile. That is, the traffic manager may store and continuously access the time-based profile while managing traffic for the service.

At operation 508, the time-based profile causes the traffic manager to switch from using the first traffic routing configuration to using a second traffic routing configuration. At operation 510, the traffic manager routes the traffic for the service based on the second traffic routing configuration after the first time.

Then, at operation 512, the traffic manager determines that the current time corresponds to a second time specified in the time-based profile. At operation 514, the time-based profile causes the traffic manager to switch from using the second traffic routing configuration (i) back to using the first traffic routing configuration or (ii) to using a third traffic routing configuration.

Finally, at operation 516, the traffic manager routes the traffic for the service based on the second traffic routing configuration or the third traffic routing configuration after the second time.

With reference to FIG. 6, the routine 600 begins at operation 602 where a traffic analyzer collects traffic data for the service over a long period of time. At operation 604, the traffic analyzer analyzes the collected traffic data to determine that a traffic pattern, contained between a first time and a second time associated with a start and an end of a real-world event, indicates an amount of traffic that exceeds a threshold amount established to indicate a possibility of traffic overload for an endpoint. At operation 606, the traffic analyzer provides the traffic pattern, the first time, the second time, and an identification of the endpoint to a provider of the service.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

Figure 7:
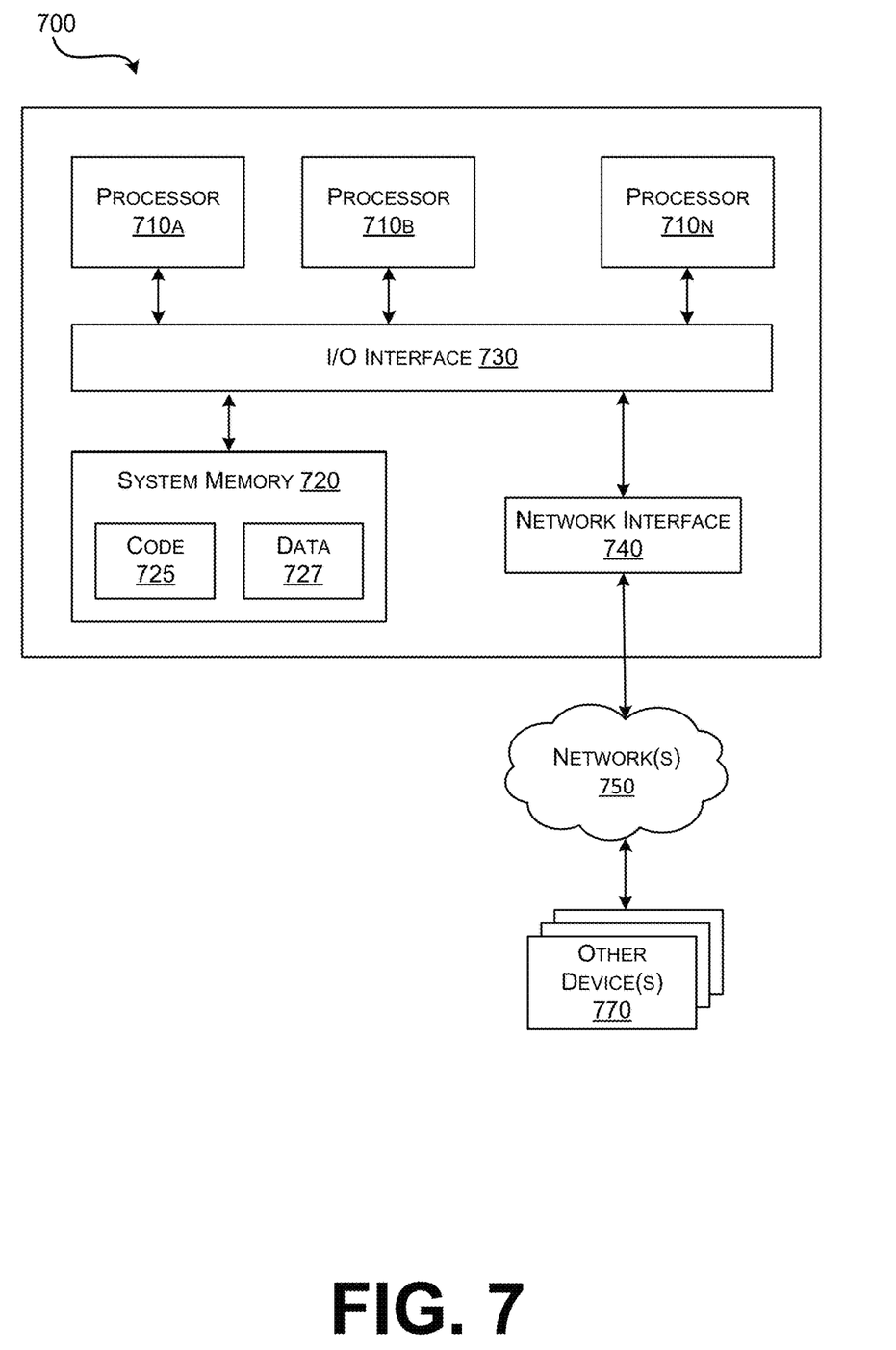
FIG. 7 is an example computing system capable of implementing the techniques of the present disclosure.

FIG. 7 illustrates a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 700 further includes a network interface 740 coupled to the I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those routines, techniques and data described above, are shown stored within system memory 720 as code 725 and data 727.

In one embodiment, the I/O interface 730 may be configured to coordinate I/O traffic between the processor 710, system memory 720, and any peripheral devices in the device, including network interface 740 or other peripheral interfaces. In some embodiments, the I/O interface 730 may perform any necessary protocol, timing, or other data transformations to convert data signals from one component (e.g., system memory 720) into a format suitable for use by another component (e.g., processor 710). In some embodiments, the I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of the I/O interface 730, such as an interface to system memory 720, may be incorporated directly into processor 710.

Network interface 740 may be configured to allow data to be exchanged between computing device 700 and other device or devices 770 attached to a network or network(s) 750, such as other computer systems or components illustrated in FIGS. 1 through 3, for example. In various embodiments, network interface 740 may support communication via any suitable wired or wireless general data networks. Additionally, network interface 740 may support communication via telecommunications/telephony networks such as analog voice networks or digital fiber communications networks, via storage area networks such as Fibre Channel SANs or via any other suitable type of network and/or protocol.

Network(s) 750 may include, for example, public networks such as the Internet, private networks such as an institutional and/or personal intranet, or some combination of private and public networks. Network(s) 750 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 750 may utilize communications protocols, including packet-based and/or datagram-based protocols such as Internet protocol ("IP"), transmission control protocol ("TCP"), user datagram protocol ("UDP"), or other types of protocols. Moreover, network(s) 750 may also include a number of devices that facilitate network communications and/or form a hardware basis for the networks, such as switches, routers, gateways, access points, firewalls, base stations, repeaters, backbone devices, and the like.

In some embodiments, system memory 720 may be one embodiment of a computer-accessible medium configured to store program instructions and data as described above for FIGS. 1-6. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740.

Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "system" and/or "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses.

Example Clause A, a method for proactively switching traffic routing configurations to accommodate a peak load time period, the method comprising: receiving traffic for a service, wherein the service is provided via a plurality of endpoints and the traffic includes requests that originate within a particular geographic location; routing, by one or more processors, the traffic for the service based on a first traffic routing configuration, wherein the first traffic routing configuration routes an individual request to a first endpoint, of the plurality of endpoints, that provides a lowest latency based on the particular geographic location where the individual request originates; determining that a current time corresponds to a start time for a real-world event, as specified in a predefined time-based profile; in response to determining that the current time corresponds to the start time for the real-world event, causing a switch from the first traffic routing configuration to a second traffic routing configuration, wherein the second traffic routing configuration routes at least a portion of the traffic to a second endpoint, of the plurality of endpoints, to reduce a load on the first endpoint during the real-world event; routing the traffic for the service based on the second traffic routing configuration after the start time for the real-world event; determining that the current time corresponds to an end time for the real-world event, as specified in the predefined time-based profile; in response to determining that the current time corresponds to the end time for the real-world event, causing a switch from the second routing configuration back to the first routing configuration; and routing the traffic for the service based on the first routing configuration after the end time for the real-world event.

Example Clause B, the method of Example Clause A, further comprising: collecting traffic data for the service over a period of time; analyzing the collected traffic data to determine that a traffic pattern, contained between the start time and the end time for the real-world event, indicates an amount of traffic that exceeds a threshold amount established to indicate a possibility of traffic overload for the first endpoint; and providing the traffic pattern, the start time, the end time, and an identification of the first endpoint to a provider of the service.

Example Clause C, the method of Example Clause B, further comprising: determining, based on the analysis of the collected traffic data, that the real-world event is a periodic event; and identifying the start time and the end time for periodic instances of the real-world event.

Example Clause D, the method of Example Clause C, further comprising receiving an indication that the real-world event is scheduled for a duration between the start time and the end time.

Example Clause E, the method of any one of Example Clauses A through D, implemented by a Domain Name System global server load balancer, a Transmission Control Protocol and the Internet Protocol (TCP/IP) router, a User Datagram Protocol (UDP) load balancer, or a Hypertext Transfer Protocol (HTTP) load balancer.

Example Clause F, a system comprising: one or more processors; and a computer-readable storage medium having computer-executable instructions stored thereupon which, when executed by the one or more processors, cause the system to perform operations comprising: receiving a time-based profile for proactively switching between traffic routing configurations for a service; routing traffic for the service based on a first traffic routing configuration; determining that a current time corresponds to a first time specified in the time-based profile; in response to determining that the current time corresponds to the first time specified in the time-based profile, causing a switch from the first traffic routing configuration to a second traffic routing configuration; routing the traffic for the service based on the second traffic routing configuration after the first time; determining that the current time corresponds to a second time specified in the time-based profile; in response to determining that the current time corresponds to the second time, causing a switch from the second traffic routing configuration (i) back to the first traffic routing configuration or (ii) to a third traffic routing configuration; and routing the traffic for the service based on the second traffic routing configuration or the third traffic routing configuration after the second time.

Example Clause G, the system of Example Clause F, wherein the operations further comprise: collecting traffic data for the service over a period of time; analyzing the collected traffic data to determine that a traffic pattern, contained between the first time and the second time, indicates an amount of traffic that exceeds a threshold amount established to indicate traffic overload for an endpoint; and providing the traffic pattern, the first time, the second time, and an identification of the endpoint to a provider of the service.

Example Clause H, the system of Example Clause G, wherein the operations further comprise: determining, based on the analysis of the collected traffic data, that the traffic pattern corresponds to a periodic real-world event; and providing an indication of the periodic real-world event to the provider of the service.

Example Clause I, the system of any one of Example Clauses F through H, wherein the traffic includes requests that originate within a particular geographic location and the first traffic routing configuration routes an individual request to an endpoint, of a plurality of endpoints that offer the service, that provides a lowest latency based on the particular geographic location where the individual request originates.

Example Clause J, the system of Example Clause I, wherein the second traffic routing configuration routes at least a portion of the traffic to another endpoint, of the plurality of endpoints, to reduce a load on the endpoint during a time period between the first time and the second time.

Example Clause K, the system of any one of Example Clauses F through J, implemented as a Domain Name System global server load balancer, a Transmission Control Protocol and the Internet Protocol (TCP/IP) router, User Datagram Protocol (UDP) load balancer, or a Hypertext Transfer Protocol (HTTP) load balancer.

Example Clause L, the system of any one of Example Clauses F through H, wherein the first traffic routing configuration and the second traffic routing configuration are selected from a group comprising: a performance traffic routing configuration, a weighted traffic routing configuration, a geographic traffic routing configuration, a multivalue traffic routing configuration, or a subnet traffic routing configuration.

Example Clause M, the system of any one of Example Clauses F through L, wherein the first time and the second time correspond to a real-world event and the operations further comprise: receiving an announcement of a new instance of the real-world event; and updating the time-based profile to reflect an announced start time and an announced end time of the new instance of the real-world event.

Example Clause N, a method comprising: receiving a time-based profile for proactively switching between traffic routing configurations for a service; routing, by one or more processors, traffic for the service based on a first traffic routing configuration; determining that a current time corresponds to a first time specified in the time-based profile; in response to determining that the current time corresponds to the first time specified in the time-based profile, causing a switch from the first traffic routing configuration to a second traffic routing configuration; routing the traffic for the service based on the second traffic routing configuration after the first time; determining that the current time corresponds to a second time specified in the time-based profile; in response to determining that the current time corresponds to the second time, causing a switch from the second traffic routing configuration (i) back to the first traffic routing configuration or (ii) to a third routing configuration; and routing the traffic for the service based on the second traffic routing configuration or the third traffic routing configuration after the second time.

Example Clause O, the method of Example Clause N, further comprising: collecting traffic data for the service over a period of time; analyzing the collected traffic data to determine that a traffic pattern, contained between the first time and the second time, indicates an amount of traffic that exceeds a threshold amount established to indicate traffic overload for an endpoint; and providing the traffic pattern, the first time, the second time, and an identification of the endpoint to a provider of the service.

Example Clause P, the method of Example Clause N or Example Clause O, wherein the traffic includes requests that originate within a particular geographic location and the first traffic routing configuration routes an individual request to an endpoint, of a plurality of endpoints that offer the service, that is geographically closest to the particular geographic location where the individual request originates.

Example Clause Q, the method of Example Clause P, wherein the second traffic routing configuration routes at least a portion of the traffic to another endpoint, of the plurality of endpoints, to reduce a load on the endpoint during a time period between the first time and the second time.

Example Clause R, the method of any one of Example Clauses N through Q, implemented by a Domain Name System (DNS) global server load balancer, a Transmission Control Protocol and the Internet Protocol (TCP/IP) router, a User Datagram Protocol (UDP) load balancer, or a Hypertext Transfer Protocol (HTTP) load balancer.

Example Clause S, the method of Example Clause N or Example Clause O, wherein the first traffic routing configuration and the second traffic routing configuration are selected from a group comprising: a performance traffic routing configuration, a weighted traffic routing configuration, a geographic traffic routing configuration, a multivalue traffic routing configuration, or a subnet traffic routing configuration.

Example Clause T, the method of any one of Example Clauses N through S, wherein the first time and the second time correspond to a real-world event and the method further comprises: receiving an announcement of a new instance of the real-world event; and updating the time-based profile to reflect an announced start time and an announced end time of the new instance of the real-world event.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different times, two different endpoints, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system comprising:
   one or more processors; and
   a computer-readable storage medium having computer-executable instructions stored thereupon which, when executed by the one or more processors, cause the system to perform operations comprising:
      collecting traffic data for a service over a period of time;
      analyzing the traffic data to determine that a traffic pattern, contained between a first time and a second time, indicates an amount of traffic that exceeds a threshold amount established to indicate traffic overload for an endpoint;
      providing the traffic pattern, the first time, the second time, and an identification of the endpoint to a provider of the service;
      receiving, from the provider of the service, a time-based profile for proactively switching between traffic routing configurations for the service, wherein the time-based profile specifies the first time and the second time;
      routing traffic for the service based on a first traffic routing configuration;
      determining that a current time corresponds to the first time specified in the time-based profile;
      in response to determining that the current time corresponds to the first time specified in the time-based profile, causing a switch from the first traffic routing configuration to a second traffic routing configuration;
      routing the traffic for the service based on the second traffic routing configuration after the first time;
      determining that the current time corresponds to the second time specified in the time-based profile;
      in response to determining that the current time corresponds to the second time, causing a switch from the second traffic routing configuration (i) back to the first traffic routing configuration or (ii) to a third traffic routing configuration; and
      routing the traffic for the service based on the second traffic routing configuration or the third traffic routing configuration after the second time.

2. The system of claim 1, wherein the operations further comprise:
   determining, based on the analysis of the traffic data, that the traffic pattern corresponds to a periodic real-world event; and
   providing an indication of the periodic real-world event to the provider of the service.

3. The system of claim 1, wherein:
   the traffic includes requests that originate within a particular geographic location and the first traffic routing configuration routes an individual request to the endpoint which is one of a plurality of endpoints that offer the service; and
   the endpoint, compared to other endpoints of the plurality of endpoints, provides a lowest latency based on the particular geographic location where the individual request originates.

4. The system of claim 3, wherein the second traffic routing configuration routes at least a portion of the traffic to another endpoint, of the plurality of endpoints, to reduce a load on the endpoint during a time period between the first time and the second time.

5. The system of claim 1, implemented as a Domain Name System global server load balancer, a Transmission Control Protocol and the Internet Protocol (TCP/IP) router, User Datagram Protocol (UDP) load balancer, or a Hypertext Transfer Protocol (HTTP) load balancer.

6. The system of claim 1, wherein the first traffic routing configuration and the second traffic routing configuration are selected from a group comprising: a performance traffic routing configuration, a weighted traffic routing configuration, a geographic traffic routing configuration, a multivalue traffic routing configuration, or a subnet traffic routing configuration.

7. The system of claim 1, wherein the first time and the second time correspond to a real-world event and the operations further comprise:
   receiving an announcement of a new instance of the real-world event; and
   updating the time-based profile to reflect an announced start time and an announced end time of the new instance of the real-world event.

8. A method comprising:
   collecting traffic data for a service over a period of time;
   analyzing the traffic data to determine that a traffic pattern, contained between a first time and a second time, indicates an amount of traffic that exceeds a threshold amount established to indicate traffic overload for an endpoint;
   providing the traffic pattern, the first time, the second time, and an identification of the endpoint to a provider of the service;
   receiving, from the provider of the service, a time-based profile for proactively switching between traffic routing configurations for the service, wherein the time-based profile specifies the first time and the second time;
   routing, by one or more processors, traffic for the service based on a first traffic routing configuration;
   determining that a current time corresponds to the first time specified in the time-based profile;
   in response to determining that the current time corresponds to the first time specified in the time-based profile, causing a switch from the first traffic routing configuration to a second traffic routing configuration;
   routing the traffic for the service based on the second traffic routing configuration after the first time;

determining that the current time corresponds to the second time specified in the time-based profile;

in response to determining that the current time corresponds to the second time, causing a switch from the second traffic routing configuration (i) back to the first traffic routing configuration or (ii) to a third routing configuration; and routing the traffic for the service based on the second traffic routing configuration or the third traffic routing configuration after the second time.

9. The method of claim 8, wherein:

the traffic includes requests that originate within a particular geographic location and the first traffic routing configuration routes an individual request to the endpoint which is one of a plurality of endpoints that offer the service; and the endpoint, compared to other endpoints of the plurality of endpoints, is geographically closest to the particular geographic location where the individual request originates.

10. The method of claim 9, wherein the second traffic routing configuration routes at least a portion of the traffic to another endpoint, of the plurality of endpoints, to reduce a load on the endpoint during a time period between the first time and the second time.

11. The method of claim 8, implemented by a Domain Name System (DNS) global server load balancer, a Transmission Control Protocol and the Internet Protocol (TCP/IP) router, a User Datagram Protocol (UDP) load balancer, or a Hypertext Transfer Protocol (HTTP) load balancer.

12. The method of claim 8, wherein the first traffic routing configuration and the second traffic routing configuration are selected from a group comprising: a performance traffic routing configuration, a weighted traffic routing configuration, a geographic traffic routing configuration, a multivalue traffic routing configuration, or a subnet traffic routing configuration.

13. The method of claim 8, wherein the first time and the second time correspond to a real-world event and the method further comprises:

receiving an announcement of a new instance of the real-world event; and updating the time-based profile to reflect an announced start time and an announced end time of the new instance of the real-world event.

* * * * *